(12) United States Patent
Bennett et al.

(10) Patent No.: US 10,919,537 B2
(45) Date of Patent: Feb. 16, 2021

(54) VEHICLE SENSOR TRACKING FOR CUSTOMIZED VEHICLE PROFILE

(71) Applicant: TOYOTA MOTOR NORTH AMERICA, INC., Plano, TX (US)

(72) Inventors: Trent B. Bennett, Prosper, TX (US); Aghyad Saleh, Grand Prairie, TX (US); Joshua C. Batie, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 92 days.

(21) Appl. No.: 16/407,526

(22) Filed: May 9, 2019

(65) Prior Publication Data
US 2020/0353937 A1  Nov. 12, 2020

(51) Int. Cl.
| | |
|---|---|
| G08B 23/00 | (2006.01) |
| B60W 40/09 | (2012.01) |
| G06K 9/00 | (2006.01) |
| B60W 50/12 | (2012.01) |

(52) U.S. Cl.
CPC ............ *B60W 40/09* (2013.01); *B60W 50/12* (2013.01); *G06K 9/00845* (2013.01)

(58) Field of Classification Search
CPC ... B60W 40/09; B60W 50/12; G06K 9/00845
USPC ........................................................ 340/576
See application file for complete search history.

(56) References Cited

U.S. PATENT DOCUMENTS

| | | | | |
|---|---|---|---|---|
| 8,981,942 B2 * | 3/2015 | He | ................. | B60K 28/066 340/576 |
| 9,767,689 B1 * | 9/2017 | Cain | ................. | G08G 1/096758 |
| 10,196,071 B1 * | 2/2019 | Rowson | ................. | B60W 40/09 |
| 10,762,723 B1 * | 9/2020 | Zhou | ................. | G07B 15/02 |
| 2008/0243558 A1 | 10/2008 | Gupte | | |
| 2009/0164400 A1 | 6/2009 | Amer-Yahia et al. | | |
| 2010/0001558 A1 | 1/2010 | Petrovski | | |
| 2013/0073129 A1 * | 3/2013 | Martin | ................. | B60L 50/40 701/22 |
| 2013/0073473 A1 | 3/2013 | Heath | | |

(Continued)

FOREIGN PATENT DOCUMENTS

EP      2905737 A1     8/2015

OTHER PUBLICATIONS

Anonymous, "Social and Psychological Factors Affecting Borrowing Behaviour: A Review", Jun. 4, 2018, https://loanbase.com.au/blog/psychosocial-borrowing.

(Continued)

*Primary Examiner* — Naomi J Small

(57) ABSTRACT

An example operation may include one or more of monitoring data when the data is associated with at least one detected behavior of a first user, quantifying the at least one detected behavior into a first value, sending the first value to a first server and a second server, comparing the first value to a first threshold at the first server, comparing the first value to a second threshold at the second server, determining whether to increment a first score at the first server and a second score at the second server, when the first value is greater than one or more of the first threshold and the second threshold, and determining whether to decrement the first score at the first server and the second score at the second server, when the first value is less than one or more of the first threshold and the second threshold.

20 Claims, 16 Drawing Sheets

(56) References Cited

U.S. PATENT DOCUMENTS

| | | | | |
|---|---|---|---|---|
| 2014/0372017 | A1* | 12/2014 | Armitage | B60W 40/09 |
| | | | | 701/117 |
| 2016/0046298 | A1* | 2/2016 | DeRuyck | B60W 50/14 |
| | | | | 340/576 |
| 2016/0236691 | A1* | 8/2016 | Armitage | B60W 40/09 |
| 2017/0305434 | A1* | 10/2017 | Ratnasingam | B60W 40/09 |
| 2017/0356350 | A1* | 12/2017 | Li | F02D 11/02 |
| 2018/0018723 | A1 | 1/2018 | Nagla et al. | |
| 2018/0068392 | A1* | 3/2018 | Bowes | H04M 15/58 |
| 2020/0074492 | A1* | 3/2020 | Scholl | G06Q 50/30 |

OTHER PUBLICATIONS

Fenwick, "How's your social credit score?", http://www.hult.edu/blog/your-social-credit-score/, posted 12 months ago from May 3, 2019.

Galeon, "China's "Social Credit System" Will Rate How Valuable You Are as a Human",https://futurism.com/china-social-credit-system-rate-human-value, Dec. 2, 2017.

Tereshchenko, "Blockchain and Smart Contracts in Cargo Transportation", pp. 163-165, 2018.

* cited by examiner

VEHICLE SENSOR TRACKING FOR CUSTOMIZED VEHICLE PROFILE

TECHNICAL FIELD

This application generally relates to identifying and customizing vehicle profiles, and more particularly, to vehicle sensor tracking for customized vehicle profile.

BACKGROUND

Vehicles or transports, such as cars, motorcycles, trucks, planes, trains, etc., are generally moving at high speeds and experiencing varying conditions, such as road conditions, traffic patterns, unsafe drivers of other vehicles, vehicle conditions, safety conditions, weather conditions, etc. The vehicle data may be received from sensors on and/or inside the vehicle, and/or which may be captured by computing devices, such as a computer that controls the vehicle itself and/or via a controller held and managed by a user, such as a smartphone or a computer.

Users of vehicles may be from all walks of life. The users may be young and inexperienced vehicle operators, older with extensive experience or elderly with diminishing driving skills. The vehicles offer numerous features from hard-coded software which may govern an acceleration rate, speed, or suspension function to peripheral features, such as temperature-controlled seats, and multimedia functions. The extensive lists of features offered by vehicles can be often considered distractions or unsafe to certain drivers. As vehicles are being operated by less safe drivers or drivers with unproven records, the vehicle may be customized to offer limited resources to increase safety and reduce risks until such drivers demonstrate driving proficiency.

SUMMARY

One example embodiment may provide a method that includes one or more of monitoring data when the data is associated with at least one detected behavior of a first user, quantifying the at least one detected behavior into a first value, sending the first value to a first server and a second server, comparing the first value to a first threshold at the first server, comparing the first value to a second threshold at the second server, determining whether to increment a first score at the first server and a second score at the second server, when the first value is greater than one or more of the first threshold and the second threshold, and determining whether to decrement the first score at the first server and the second score at the second server, when the first value is less than one or more of the first threshold and the second threshold.

Another example embodiment may provide a system including a user device associated with a first user, a first server, and a second server operated by a third party associated with the user device, wherein the user device contains a processor and memory on which are stored machine-readable instructions that when executed by the processor, cause the processor to perform one or more of monitor data when the data is associated with at least one detected behavior of the first user, quantify the at least one detected behavior into a first value, send the first value to the first server and the second server, wherein the first server is configured to compare the first value to a first threshold, and wherein the second server is configured to compare the first value to a second threshold, wherein at least one of the first server and second server is configured to determine whether to increment a first score at the first server and a second score at the second server, when the first value is greater than one or more of the first threshold and the second threshold, and decrement the first score at the first server and the second score at the second server, when the first value is less than one or more of the first threshold and the second threshold.

A further example embodiment may provide a non-transitory computer readable medium comprising instructions, that when read by a processor, cause the processor to perform one or more of monitoring data when the data is associated with at least one detected behavior of a first user, quantifying the at least one detected behavior into a first value, sending the first value to a first server and a second server, comparing the first value to a first threshold at the first server, comparing the first value to a second threshold at the second server, determining whether to increment a first score at the first server and a second score at the second server, when the first value is greater than one or more of the first threshold and the second threshold, and determining whether to decrement the first score at the first server and the second score at the second server, when the first value is less than one or more of the first threshold and the second threshold.

A yet further example embodiment may provide a method comprising one or more of initiating a vehicle event, retrieving a user profile associated with a user participating in the vehicle event, applying a vehicle status, based on the user profile, to the vehicle event, permitting access to a first set of vehicle features based on the vehicle status, collecting vehicle actions performed during the vehicle event for a period of time and determining whether to increase or decrease a vehicle status based on the collected vehicle actions.

A yet further example embodiment may provide a system comprising a user device, a vehicle, and a server configured to perform one or more of initiate a vehicle event, retrieve a user profile associated with the user device participating in the vehicle event, apply a vehicle status, based on the user profile, to the vehicle event and the vehicle, permit access to a first set of vehicle features of the vehicle based on the vehicle status, collect vehicle actions performed during the vehicle event for a period of time, and determine whether to increase or decrease a vehicle status based on the collected vehicle actions.

A yet further example embodiment may provide a non-transitory computer readable medium comprising instructions, that when read by a processor, cause the processor to perform one or more of cause the processor to perform initiating a vehicle event, retrieving a user profile associated with a user participating in the vehicle event, applying a vehicle status, based on the user profile, to the vehicle event, permitting access to a first set of vehicle features based on the vehicle status, collecting vehicle actions performed during the vehicle event for a period of time, and determining whether to increase or decrease a vehicle status based on the collected vehicle actions.

DETAILED DESCRIPTION

Figure 1A:
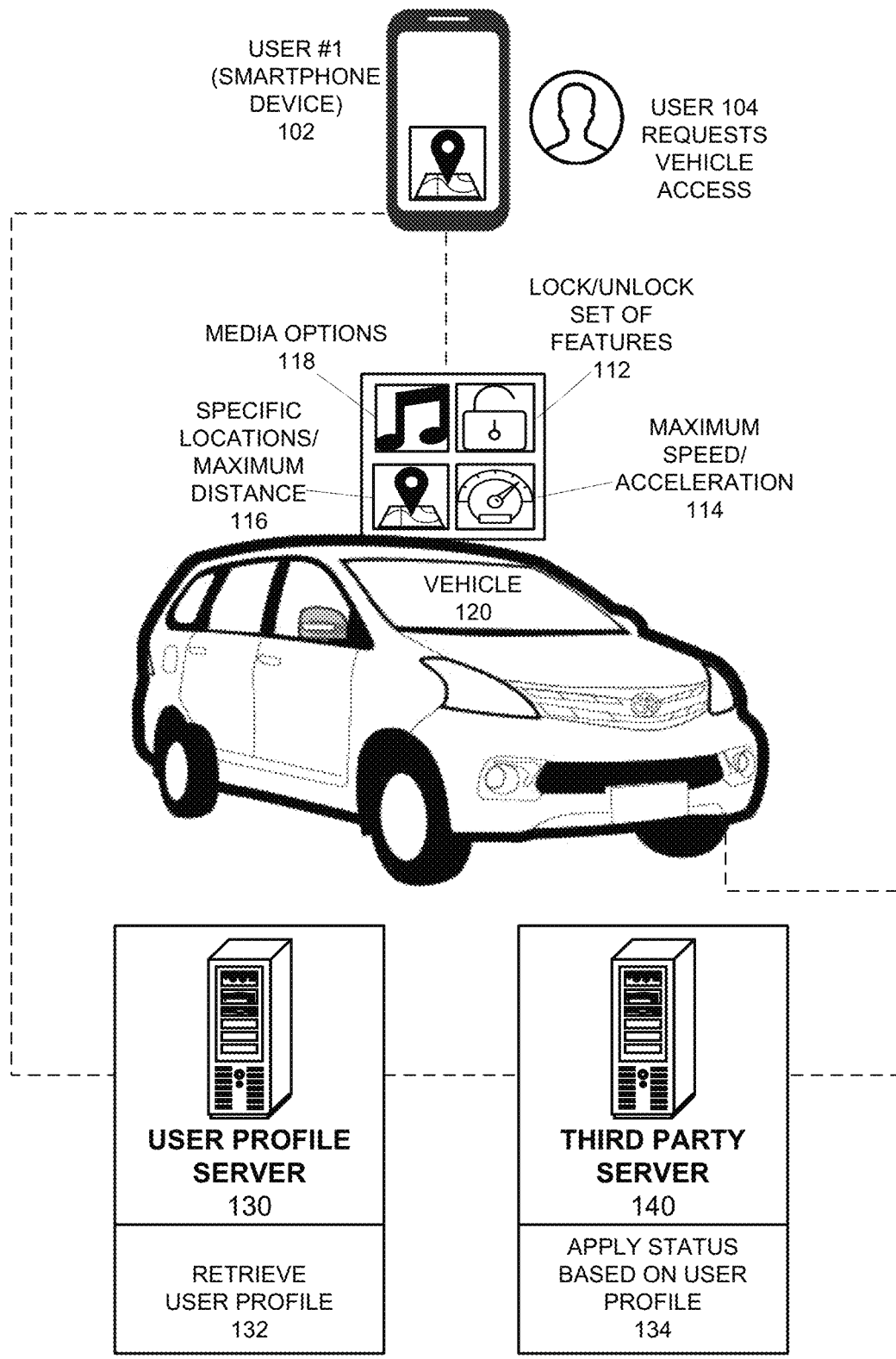
FIG. 1A illustrates a diagram of a transport event management system, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) sensor data collection system, a verification system, and a vehicle data distribution system. The sensor data, received in the form of communication update messages, such as wireless data network communications and/or wired communication messages, may be received and processed to identify vehicle/transport status conditions and provide safety and optimal transport modification options to assist with vehicle travel. For example, a user profile applied to a particular transport/vehicle may be upgraded, downgraded, etc., to offer additional vehicle options depending on the driving status and/or other factors demonstrating optimal/poor behavior.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for vehicle events to be controlled by a permission granting entity and in a "decentralized" manner, such as via a blockchain membership group. Each interested party (i.e., driver, remote driver, company, agency, occupant, etc.) may want to limit the exposure of private information, and therefore the blockchain and its immutability can limit the exposure and manage permissions for each particular user vehicle profile. A smart contract may be used to provide compensation, permission determination and distribution to entities seeking access to such a vehicle event (or sub-events). Also, if fraud is detected, the necessary information can be shared among the entities based on a "consensus" approach associated with the blockchain. Such an approach could not be implemented on a traditional centralized database. Although, each company has its own independent information system, it is not practical to assume that this blockchain-based approach could be implemented on a centralized system, since the consensus mechanism of the blockchain is used to share information when permission is required.

FIG. 1A illustrates a network diagram of a vehicle access request configuration, according to example embodiments. Referring to FIG. 1A, the network diagram 100 includes a user 104 accessing a user device 102 to request access to a vehicle 120. The vehicle 120 may be a rented, owned, partially owned (i.e., subject to other owners), autonomously driven, and semi-autonomously driven vehicle. The vehicle may accept the user request sent from the user device or automatically identify the user request from the user device as the user approaches the vehicle and may initiate a user profile retrieval operation 132 used to identify and then apply the user profile to the vehicle prior to a driving event. The vehicle may have a set of features and services available to the driver, however, the user profile may be limited to only a sub-set of those features given a user status. For example, a young inexperienced driver may have not yet achieved a fully optimal profile status in which case, the user may only be permitted to access a sub-set of the complete features offered by the vehicle 120.

In operation, as the user's device is identified as having sent a request to access the vehicle and/or approaching the vehicle, the vehicle 120 may apply the user profile to the vehicle. The vehicle features may be offered to the user profile based on a score, experience level, driving history, etc., associated with the user profile. For example, a high school student may have limited experience and may not be permitted to drive with any media options 118, such as pairing their smartphone 102 with the BLUETOOTH accessible media options, accessing AM/FM radio, a CD player, satellite radio, etc. The location restrictions 116 may permit the user to drive to school, work and home and may not permit the user to drive more than 20 miles away from home. The speed and acceleration features 114 may not permit the user to accelerate past a certain acceleration rate or speed to reduce the risk of a collision. After a period of time used to track driver behavior, the next set of features, which were not previously available to the user may be unlocked 112 to include certain additional features, such as faster speeds 114, greater distances 116 permitted to be driven, and/or media options 118 not previously available. The period of time may be a short period of time (i.e., 2 hours), a long period (1 week, a month, etc.) during which sensor data is collected to reevaluate the user behavior and to reward/penalize the user profile by offering more/less vehicle features.

Any of the vehicles may include sensors on any portion of the interior and/or exterior of a vehicle. The sensors may be hardwired to a central controller or other processor of the vehicle or may be in wireless communication with a central controller of the vehicle's computer via various wireless communication protocols. The data may be transmitted from the central controller, such as an on-board computer, a user's smartphone, a cellular compatible device, etc. The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc.

The types of sensors include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors.

In an effort to create an incentive for vehicle owners and/or operators to drive safer, the data collected by their vehicles' sensors may be measured and compared to known optimal values as a way to provide rewards/compensation to those vehicles and/or their users, which operate the vehicle in an optimal manner. As a vehicle collects sensor data from the sensors or via user computer devices and/or on-board computing devices, the data is collected and organized by sensor type. For purposes of this example, the sensor data, may be organized according to the sensor from which it was received and/or the device which produced the sensor data. Also, the computer devices which collect information may have such information be deemed 'sensor data' which is also forwarded to other vehicles and/or a central server. The managerial entity responsible for managing the sensor data server may be a third party which manages the sensor data and the accounts associated with each vehicle.

Autonomous vehicles may be regulated where sensor data is mandated for various reasons since operation of the vehicle is controlled by a computer and not necessarily a person. As a result, the sharing of the sensor data gathered by autonomous vehicles may be required by various agencies and third parties to ensure safety measures. As noted previously, the vehicle 120 may be a vehicle operated by a human driver or an autonomous vehicle operated by a computer and/or remote agent designed for users to ride in during a transport event. The vehicle sensor data may be collected via a plurality of the vehicle sensors. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 . . . Sn, may generate sensor data sets SD1, SD2, SD3 . . . SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, etc.

Owners of autonomous/non-autonomous vehicles (or occupants of the vehicles) may register their personal profiles in a shared ledger or other data management system so the information collected during sensor collection efforts may be shared and the owner's profile and/or vehicle may be credited with a predetermined value also identified in the shared ledger, via a smart contract. The smart contract may identify the parties of the agreement, permissions to share data, types of data, compensation for the data, current profile statuses and other parameters.

The immutability of the sensor data may also be preserved via the shared ledger format of a blockchain. The vehicle owner ultimately selects to share their data by storing it in a blockchain that exists in a cloud network. The blockchain can also facilitate the reward aspect, whether in a conventional manner or via tokens or other types of reward. In one example, the vehicles offload their sensor data to the cloud over a wireless communication network (e.g., mobile cellular network). The data is added to a blockchain but remains under the control of the vehicle owner from where such data was obtained until the vehicle owner decides to share some or all of the data. The conditions may be outlined in the smart contract which is used by the shared ledger to perform the sharing, crediting and distribution of data.

Referring again to FIG. 1A, when a user accesses a vehicle server via their smartphone device 102, the user profile may be identified by a first server 130, such as a personal profile server, credit service server, or other server used to identify the user, their profile and/or current/previous statuses (e.g., young driver, older driver, reckless driver, safe driver, experienced/optimal driver, etc.). The first server 130 may be a reference server that links the user's personal information, personal profile, credit values, etc., to another service server 140, which may be a vehicle manufacturer, vehicle operator, vehicle service provider, etc. The servers may communicate to identify whether the user profile is properly registered, qualifies for vehicle access, etc. If so, the vehicle status 134 may be applied to the vehicle 120 so a vehicle event (i.e., access and drive event).

Figure 1B:
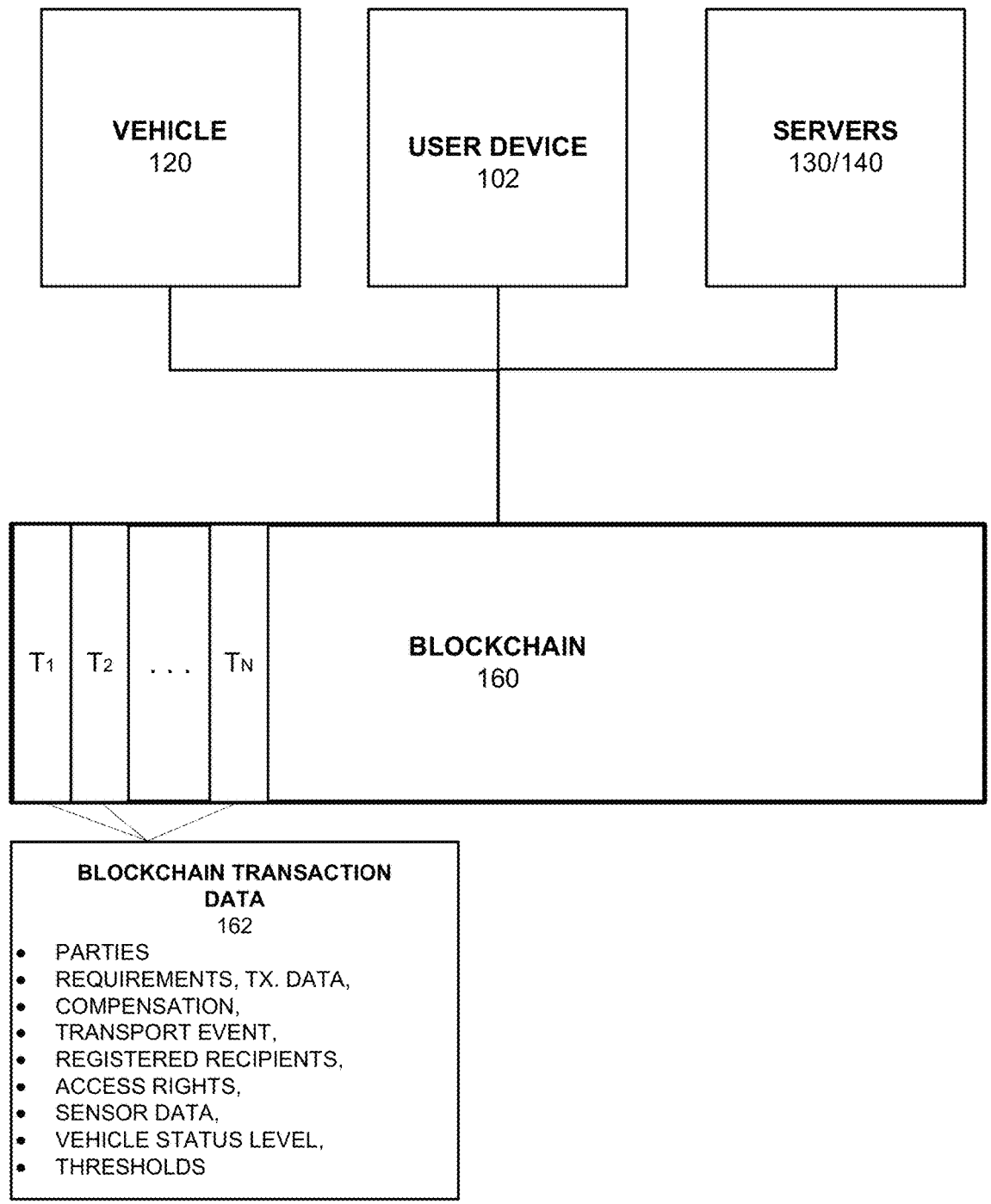
FIG. 1B illustrates a diagram of a transport event data management system utilizing a distributed ledger, according to example embodiments.

FIG. 1B illustrates a blockchain configuration for storing blockchain transaction data, according to example embodiments. Referring to FIG. 1B, the example configuration 150 demonstrates the vehicle 120, the user device 102 and the servers 130/140 sharing information with a distributed ledger (i.e., blockchain) 160. As the events occur, vehicle request, vehicle identification, user profile retrieval, user profile/access status identification and application to the vehicle, vehicle operational behavior monitoring, and upgrades/downgrades to a user profile vehicle access status. As a smart contract is used to invoke rules, information gathering and terms for vehicle access, the blockchain transaction data 162 is saved for each transaction, such as the access event, the subsequent updates to one's vehicle status, services locked/unlocked, etc. The transactions may include the parties, the requirements (e.g., 18 years of age, valid driver's license), compensation levels, the distance traveled in the event, the registered recipients permitted to access the event, the rights, sensor data retrieved during the event to log details of the event and modify a user's vehicle status, and thresholds used to make determinates about whether the event should be permitted, should be terminated, was completed, etc.

Figure 1C:
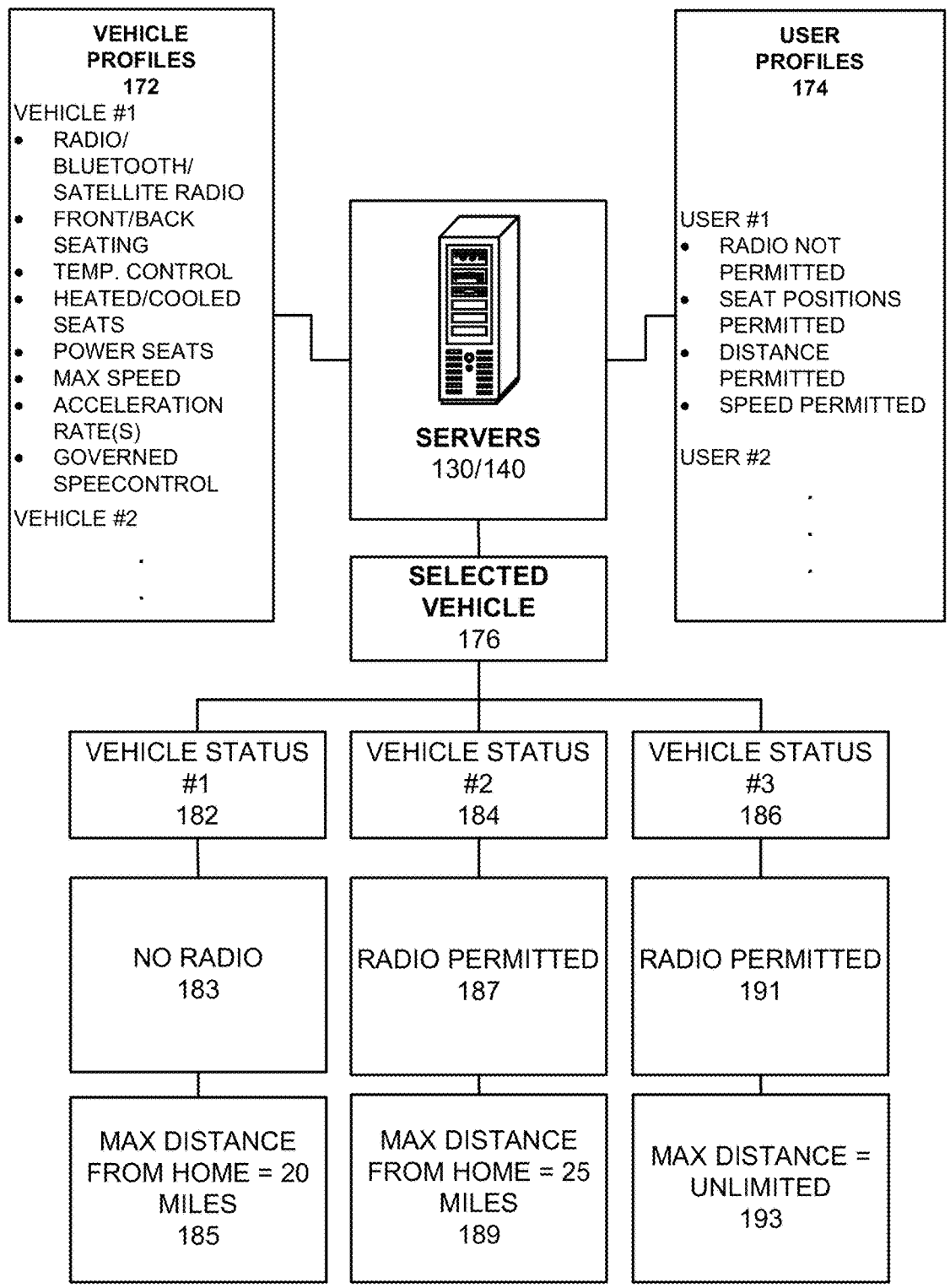
FIG. 1C illustrates a diagram of vehicle event data being processed to identify responsibility values for third parties, according to example embodiments.

FIG. 1C illustrates a vehicle and user profile identification and selection procedure, according to example embodiments. Referring to FIG. 1C, the configuration 170 includes the servers 130/140 being accessed to identify user profile information 174 by the profile server 130 and vehicle information 172 by the vehicle server 140. The vehicle profiles may store information, such as a vehicle's features, which may or may not be permitted to be used while operating the vehicle based on the settings of the user profile(s) 174. For example, in a particular scenario, a selected vehicle 176 may be paired with one or more vehicle statuses 182-186. In particular, the first vehicle status 182 may be for an 18-year-old high school student that is currently only driving to school and work both of which are within 15 miles of the user's home. The initial permissions may limit speed, acceleration, usage of the radio 183, maximum distance traveled 185. The settings may be applied to the vehicle, which uses a vehicle computer to regulate the speed via a speed instruction, regulate the distance via a navigation instruction, disable the radio until further notice, etc. In the second scenario, the vehicle status #2 184 may be for an elderly driver that has not performed well in recent driving events. In this scenario, the selected vehicle 176 may be limited to radio access 187, however, the distance permitted to be driven may be only 25 miles 189 to ensure safety for the driver and those sharing the roadways. Another example for vehicle status #3 186 provides for an experienced driver with years of experience and no recent driving events which would cause degradation in the user's reputation score. The user may access various features including the radio 191, unlimited distances 193 among other features not specifically described. As the history increases for any of the user's the recordation via sensor data may be used to increase or decrease the features permitted during a driver's vehicle event experience.

Figure 2A:
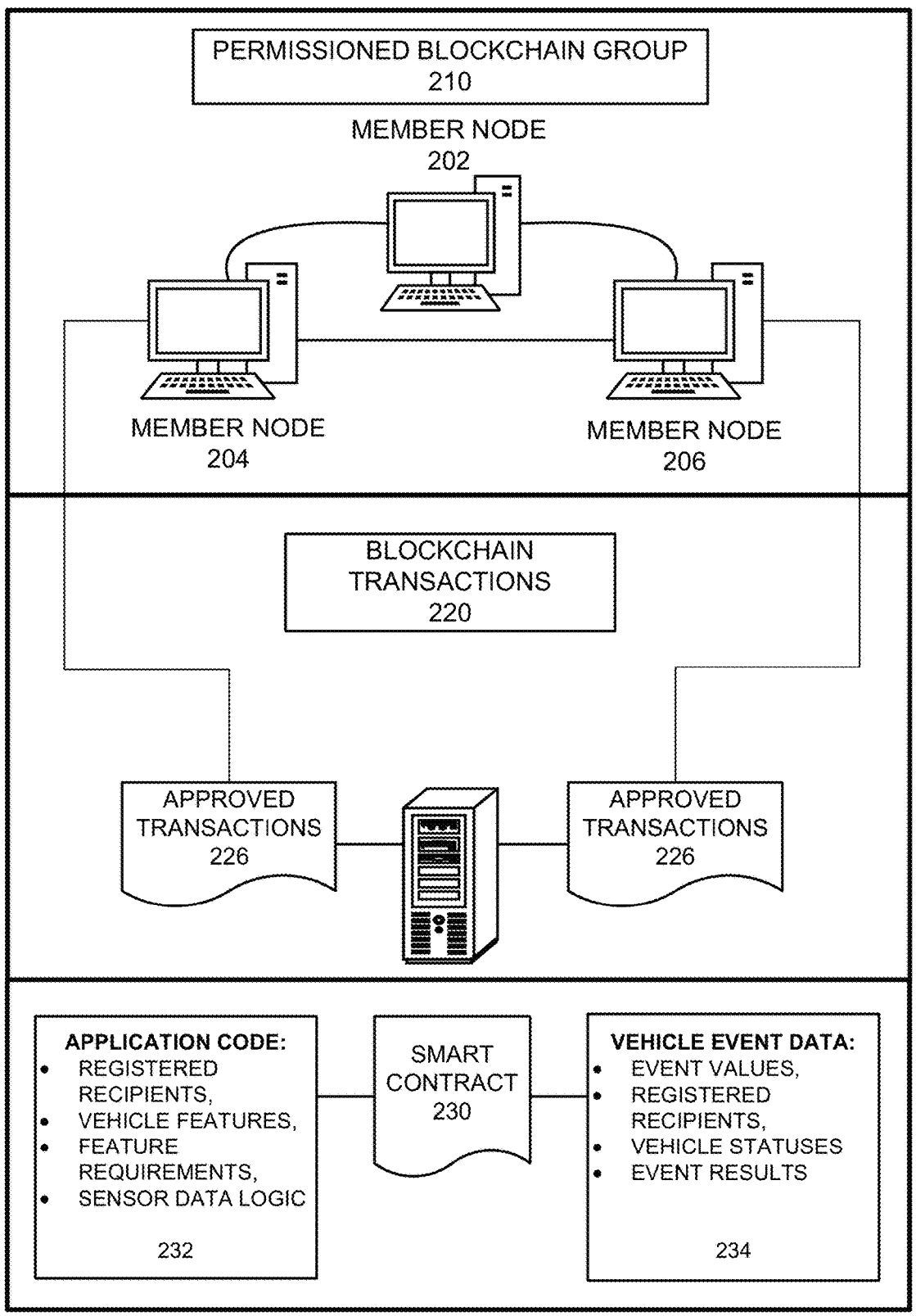
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a permissioned blockchain group 210. The permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure. In other embodiments, the blockchain group 210 may be a permissioned blockchain group.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify when sensor data exceeds various thresholds (such as impact, speed, braking, etc.) and other measures. For example, when a collision sensor is triggered, and a vehicle velocity is above a particular threshold prior to the collision, then the action may include providing emergency measures to the transports, the transports near the collision, etc. The vehicle sensor data may be based on vehicle data sharing agreements to include permissions granted to share vehicle sensor data, registered parties to receive the data, and types of sensor data to share, etc., 234.

Figure 2B:
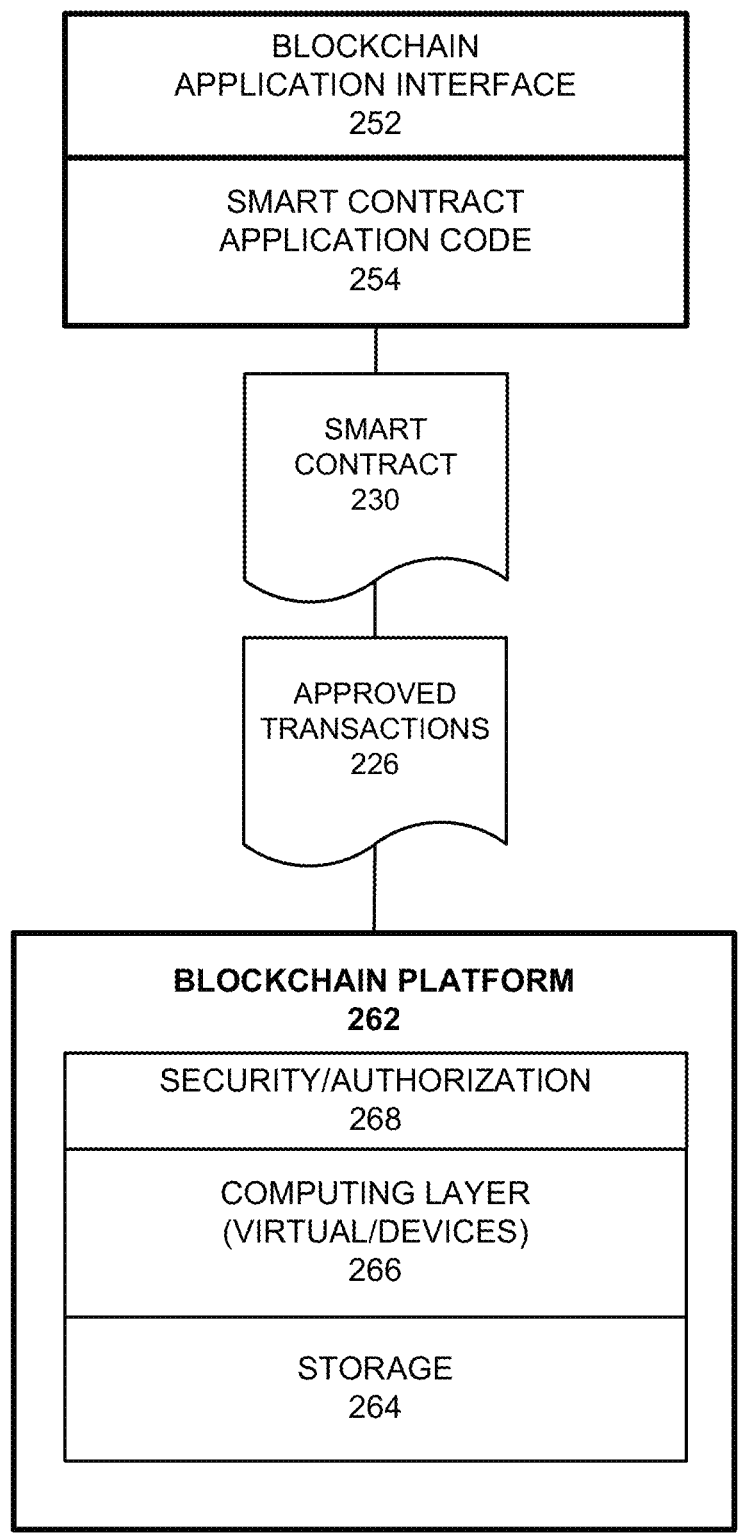
FIG. 2B illustrates a distributed ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry claim, which may be processed by one or more processing entities (e.g., processors, virtual machines, etc.) included in the blockchain layer. The result may include a decision to reject or approve the claim based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3A:
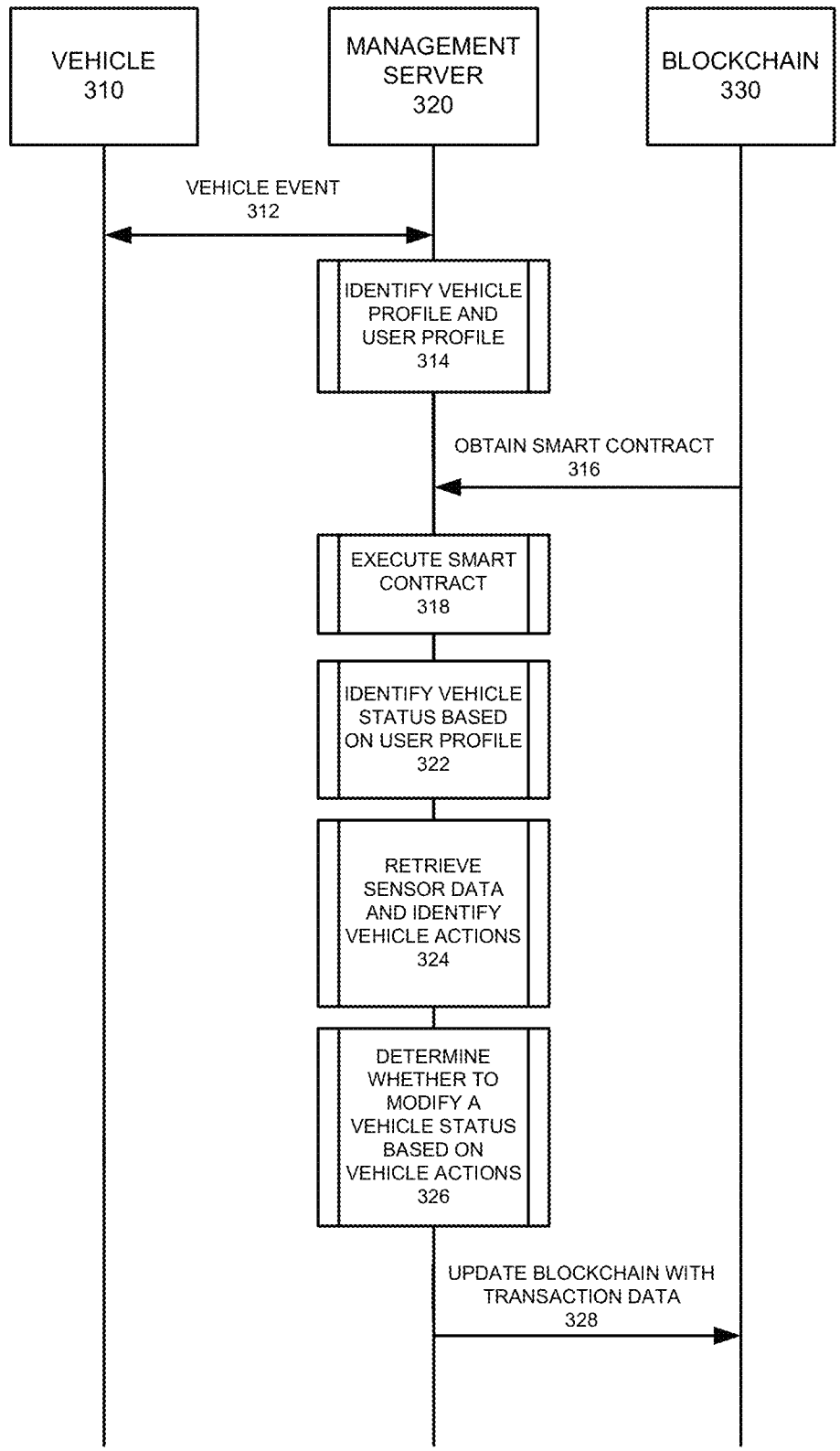
FIG. 3A illustrates a messaging diagram of a transport event management system, according to example embodiments.

FIG. 3A illustrates a transport access system configuration, according to example embodiments. Referring to FIG. 3A, the system 300 provides a transport/vehicle 310 which may be requested via a user submitted request to initiate a vehicle event 312, which may be managed by a management server 320, which represents any of the example servers used in examples of this disclosure. The server 320 may identify a particular vehicle 310 being requested, such as one owned by a user, or one that is selected for purchase, rent, or is available for rental/taxi purposes. The user profile of the requesting entity may also be retrieved 314 to apply to the vehicle along with a set of defined vehicle features which are accessible. The procedure for accessing and receiving a vehicle may be managed by a smart contract 316 associated with a blockchain. The smart contract may be executed 318 to enable a new vehicle event. The vehicle that is ideal for such an event may be identified as available, and a user profile may be accessed and applied to create a vehicle status 322. This process loads the user's profile on the vehicle computer, so the correct features are enabled/disabled by the central vehicle controller. During operation, such as once the user has started driving the vehicle or riding in the vehicle, the user's actions may be monitored via sensor data, social networking data, online activity data, etc. Any such data can be used to increase or decrease a user score based on known values to apply for certain actions. Also, once a comparison with baselines values is performed, a threshold value may be used to determine whether the user behavior is satisfactory or not and whether modifications to a user's vehicle status should be made. Sensor data is one way to ascertain whether a user is driving responsibly or not. The sensor data can be translated into vehicle actions 324. A decision may be made at the server 320 as to whether a user's vehicle status should be modified 326 or not after the data is received. All the events, changes and other recorded information may be committed to a blockchain transaction 328 and updated in the blockchain 330.

Figure 3B:
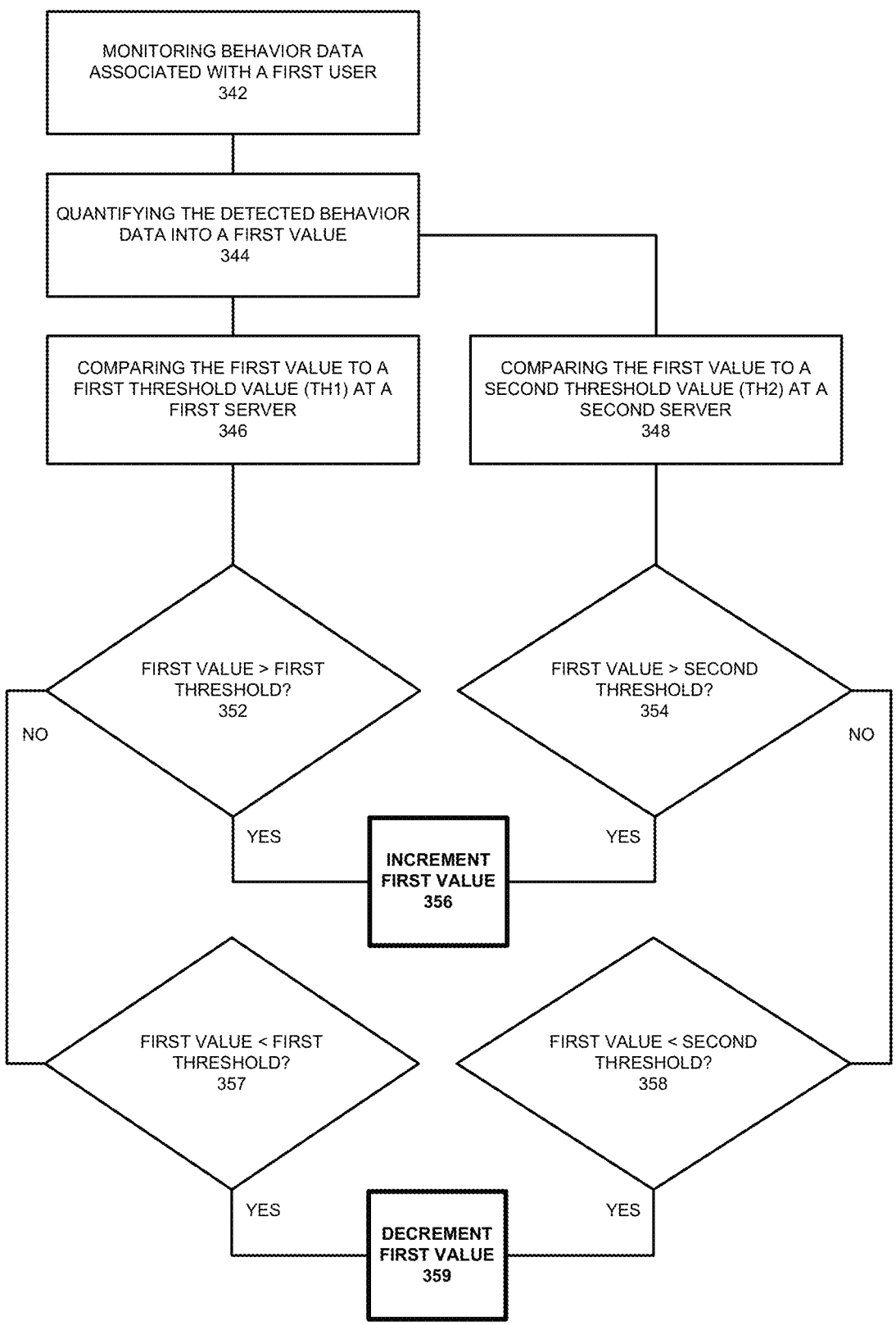
FIG. 3B illustrates a user profile monitoring configuration, according to example embodiments.

FIG. 3B illustrates a user profile monitoring configuration, according to example embodiments. Referring to FIG. 3B, the flow diagram 340 includes a process to establish a threshold used as the basis for acceptable behavior/actions conducted by a particular user and measured by a user profile record of user actions. For example, a user's behavior score can be computed by identifying a set of user actions both positive and negative over a fixed period of time, then the actions may be tabulated, summed and compared, as a value to a first threshold (TH1) stored in a first server and any indications that the user has exceeded a level of behavior, such as by meeting or exceeding the threshold, then a value increment or decrement may be performed to update the score.

In one example, the value is a social behavior score, such as compliance with expectations via a particular social networking site (i.e., no bad reports over a period of time). This score is used to rank the user on factors that may be outside of normal monetary-based values. For the purposes of this example, the value may be referred to as a social score. In a manner that is similar to a credit score that ranks a user on monetary behaviors (e.g., number of credit lines, delinquency in payments, amount of debts, etc.), the social score is based on elements that may not be monetary in nature. For example, one example of a social score pertains to the user's behavior when renting a product or sever where the product/service may be a hotel room, such as an online rental for a house, a rental transport vehicle of any kind (e.g., car, truck, scooter, bike, etc.). The condition of the product upon return or contract fulfillment is confirmed and any necessary reporting value is used to input the social score (e.g., a bike damaged may be denoted by a negative value in a user profile). As such, the condition of the house/room/transport that is ultimately reported once the user was finished with the service may be reported as a zero for non-reported issues, a negative number for reported damages and/or a positive number for non-reported issues or subsequent reviews indicating positive feedback. Referring to the example method 340, the behavior of the user is monitored 342 for a period of time based on previous history or current events which occur during the period of time. The detected behavior can be quantified into a numerical value 344 and used to compare to the first threshold (TH1) 346 used by a profile server service (first server) and/or a second threshold (TH2) 348 used by a service provider service (second server). The value used for comparison purposes may be a rating that was submitted by an entity, such as a rental company, the property owner, etc. The rating value is input into the application and stored in the servers/system. The threshold value may be stored by the system, where the threshold (TH1, TH2, etc.) would be a ceiling-level rating that, when equal or greater to the user's current score may cause a modification to the user's social score. Alternatively, a ground-rating threshold may be used to determine when the score is equal to or below that threshold, such a determination may also modify the current users' score. However, in this example, if the first value or initial value is greater than the first threshold 352 then an incremented score maintained by that server may be incremented 356. If the second server considers the score above its second threshold 354, then the value may be incremented as well 356. In one example, the second threshold TH2 is greater than the first threshold TH1, thus requiring a higher score prior to engaging in a service provided by the second management server. Conversely, when the value is less than the first threshold 357 or the second threshold 358, the value may be decremented 359 indicating the user score is not sufficient enough to receive the benefit of the service (e.g., no vehicle rental permitted). The scores may be dynamically improved over time by tracking user social behavior, driving behavior, credit behavior, however, in another example, a second user may loan or transfer credit value points to another user to increase the first user's value. As a result, the first and second servers and their thresholds may be met or exceeded by the sharing of score values among different users by combining user profiles, deducting points from one user profile and sharing them with another, etc.

Figure 3C:
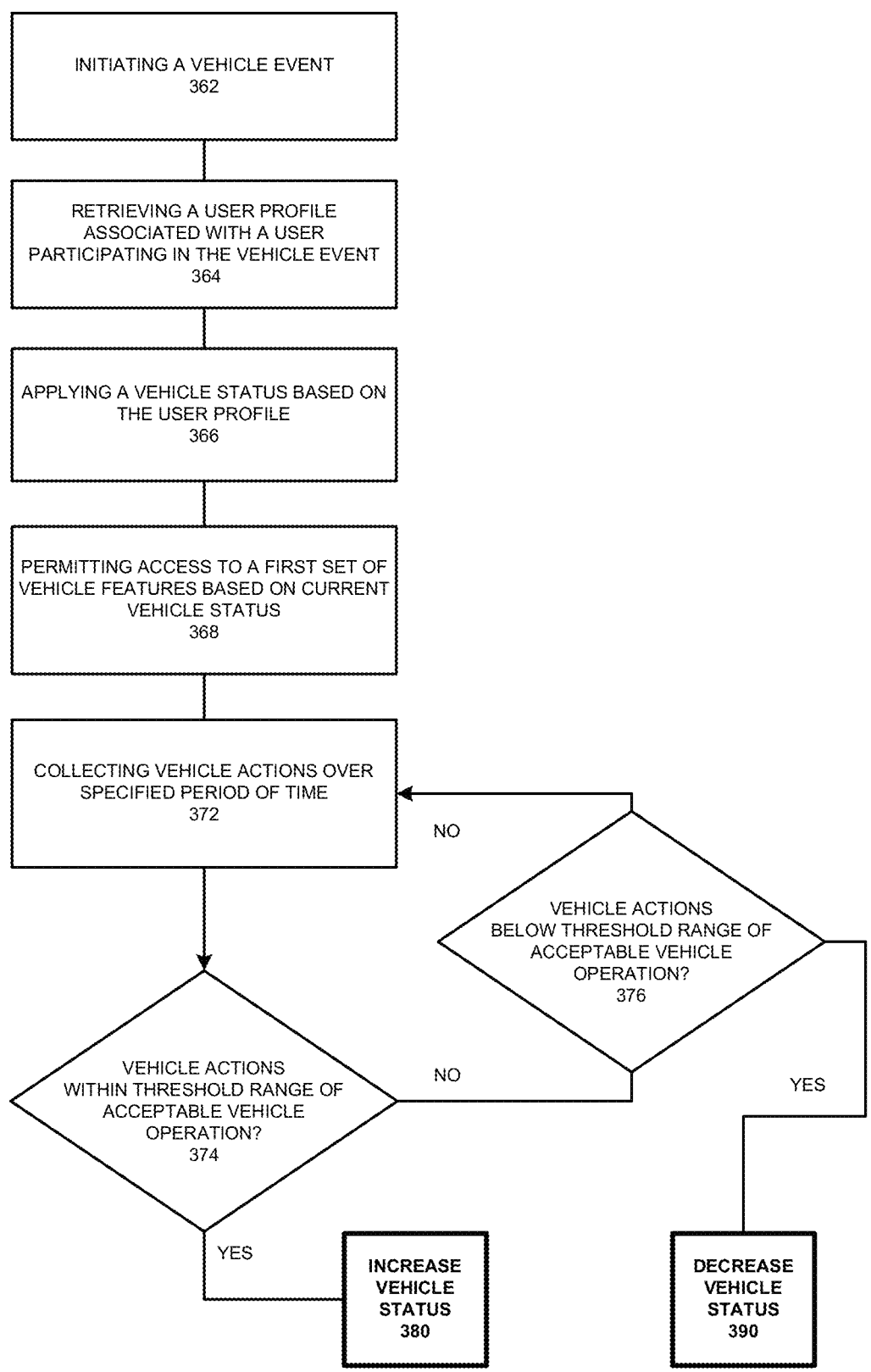
FIG. 3C illustrates a transport request and vehicle status setup configuration, according to example embodiments.

FIG. 3C illustrates a transport request and vehicle status setup configuration, according to example embodiments. Referring to FIG. 3C, the example flow diagram 360 provides a user device accessing a vehicle to perform a vehicle event 362, the event may be a trip where the vehicle will provide a transportation service. The user's profile and current score/status is identified accordingly 364 so the vehicle can be informed about the user's current status. For example, a vehicle status of a young driver may engage the vehicle to not permit long distance travel, quick acceleration, fast velocity driving, radio use, etc. In one example, the radio may only play a recurring loop of driving instructions to assist the driver with monitoring mirrors, checking engine functions, using safety measures, etc., until the user's driving has improved or has a history of good behavior indicated by their vehicle status score. The status is loaded on the vehicle 366 and the vehicle functions which the user status qualifies for are engaged 368 while the others are disabled. The vehicle actions performed during the vehicle event are captured by sensors and stored for a period of time 372. A decision is made as to whether the actions identified from the sensor data are within a threshold range of acceptable vehicle operation 374. For example, an average speed may be calculated for the vehicle event, and the average speed may be required to be within 5 MPH of a maximum threshold speed of the driving event. Or, the speed limit may be identified at all times and the speed may not be permitted to be exceeded by 5 MPH at any time for a period of five minutes. Once the vehicle actions as captured by the sensors are identified as not exceeding the threshold range, then the user's vehicle status may be increased 380, which may be indicated in their user profile, which is updated and stored on the distributed ledger. The result of the higher profile value may provide increased vehicle features in the next vehicle event, such as now the driver can listen to the radio. In the event that the vehicle actions are below the threshold range of acceptable vehicle operation 376, the value may be decreased 390, in which case, the result may be the radio is no longer permitted until the driving behavior improves.

Figure 4A:
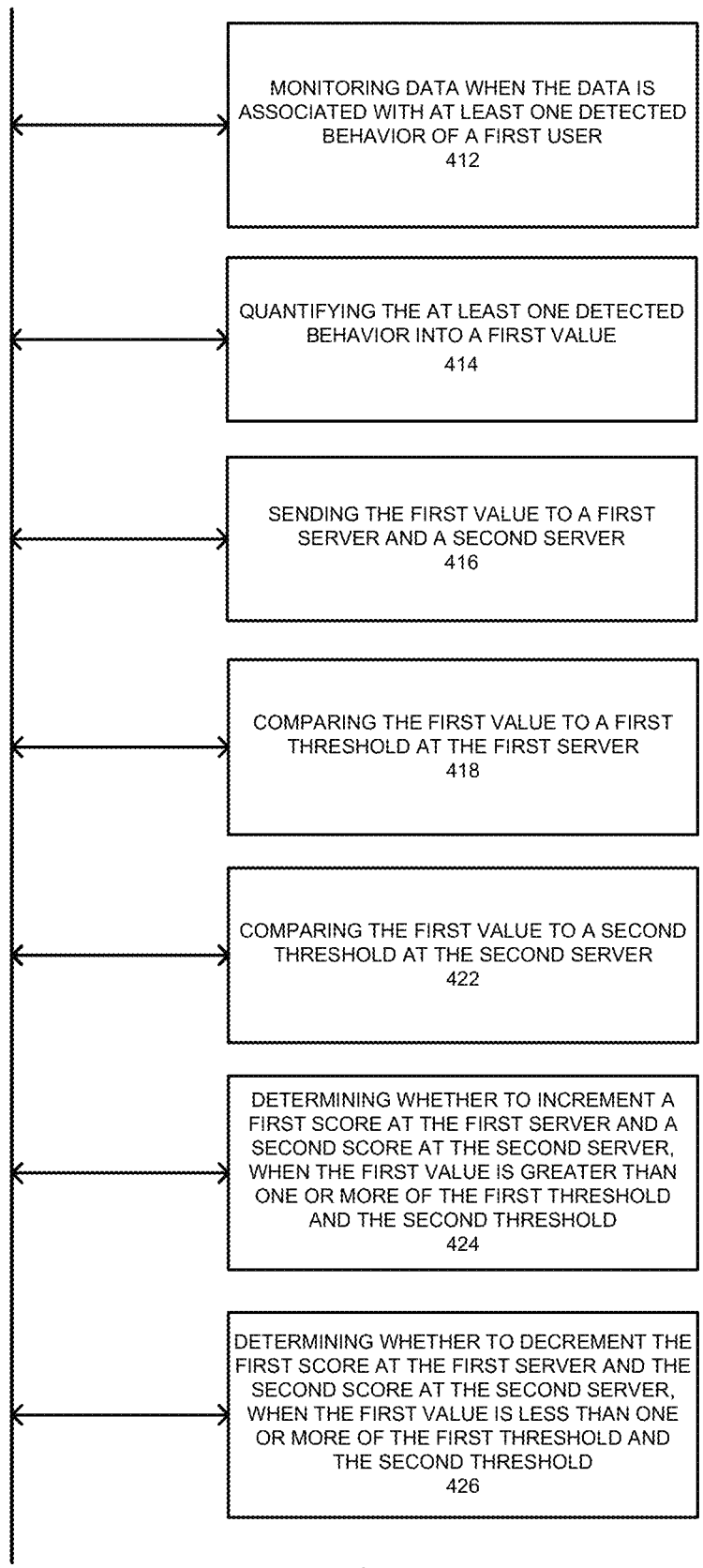
FIG. 4A illustrates a user profile monitoring configuration flow diagram, according to example embodiments.

FIG. 4A illustrates a user profile monitoring configuration flow diagram, according to example embodiments. Referring to FIG. 4A, the flow diagram 400 provides monitoring data when the data is associated with at least one detected behavior of a first user 412, quantifying the at least one detected behavior into a first value 414, such as converting the behavior detected (i.e., sensor condition) into a numerical value, sending the first value to a first server and a second server 416. The first server may be a user profile server that manages a user's score and the second server may be a service provider which recently has inquired about the user's current scores based on a request for a service (i.e., rent a car, buy a car, etc.). Once the value is identified, the value may be compared to a first threshold TH1 at the first server 418 and the second server 422. As a result, the method may also include determining whether to increment a first score at the first server and a second score at the second server, when the first value is greater than one or more of the first threshold and the second threshold 424, or, determining whether to decrement the first score at the first server and the second score at the second server, when the first value is less than one or more of the first threshold and the second threshold 426. Alternatively, the score may be unchanged if the actions were not above or below a buffer value associated with the thresholds, for example, the driver did not improve their driving enough to warrant an increase or perform badly enough to warrant a decrease in their scores. The first score may be a measure of the user's actions by the first server and the second score may be the same score as the first score or a different score depending on how the second server interprets the user's behavior actions, since the two servers could score the behaviors differently.

In one example, the method may perform deducting, via one or more of the first server and the second server, a portion of the first score and adding the deducted portion to a third score associated with a user device of a second user when the user device associated with the first user shares the portion of the first score with the third score. In this example, the second user may have convinced the first user to share some of their score in order for the second user to take their score (i.e., the third score) and improve the score so the second user can rent the vehicle or buy a car, etc. The trust system of sharing points may cause the first user profile to be linked to the second user profile, so damages or liability is then shared by both users. In another example, the method may also include incrementing, via one or more of the first server and the second server, the first score by the deducted portion, when a second value quantified by at least one detected behavior of the second user is above the second threshold, in this example, the first user receives their points back when the event is identified as acceptable, for example, if the second user does not have any point deducting events, the first user may automatically receive their loaned score portion back.

In another example, the method may provide decrementing, via one or more of the first server and the second server, the first score by the deducted portion when a second value quantified by at least one detected behavior of the second user is below the second threshold. In this example, the first user may be penalized for loaning score value to the second user when the second user is determined to have been operating below a threshold level of acceptability as determined by the servers after the second user has participated in a particular event. For example, when the second user receives access to a vehicle, drives the vehicle and is identified as performing poorly, as indicated as the below threshold measurement, the first user may receive a deduction, never receive the points back, or is penalized further for vouching for a user that did not perform optimally. In another example, the method may provide incrementing, via one or more of the first server and the second server, the first score by a value greater than the deducted portion when a second value quantified by at least one detected behavior of the second user is above the second threshold. In this example, the first user may be rewarded for the actions of the second user. The method may also include decrementing, via one or more of the first server and the second server, the first score by a value greater than the deducted portion when a second value quantified by at least one detected behavior of the second user is below the second threshold. This example provides a scenario where the servers decided to penalize the first user further since the actions of the second user may have been more severe or are too far off the threshold used to determine the second user's behavior.

In another example, the method may include applying a vehicle status to a vehicle associated with a user profile of the user when one or more of the first score and the second score is incremented, this example provides modifying a current vehicle status or permitting vehicle access when the user has seen his or her score go up in value. The result is a new vehicle status being applied to the vehicle. The method may also include applying a vehicle status to a vehicle associated with a user profile of the second user when the third score is incremented by the deducted portion of the first score. In this example, the second user may receive a vehicle status update due to the first user deducting their own status points and sharing them accordingly. The method may also include enabling the vehicle, via the second server, to be operated after the vehicle status is applied.

An example system may include a user device associated with a first user, a first server, and a second server operated by a third party associated with the user device. The user device contains a processor and memory on which are stored machine-readable instructions that when executed by the processor, cause the processor to monitor data when the data is associated with at least one detected behavior of the first user, quantify the at least one detected behavior into a first value, send the first value to the first server and the second server, and the first server is configured to compare the first value to a first threshold, and the second server is configured to compare the first value to a second threshold, and at least one of the first server and second server is configured to determine whether to increment a first score at the first server and a second score at the second server, when the first value is greater than one or more of the first threshold and the second threshold, and decrement the first score at the first server and the second score at the second server, when the first value is less than one or more of the first threshold and the second threshold.

Figure 4B:
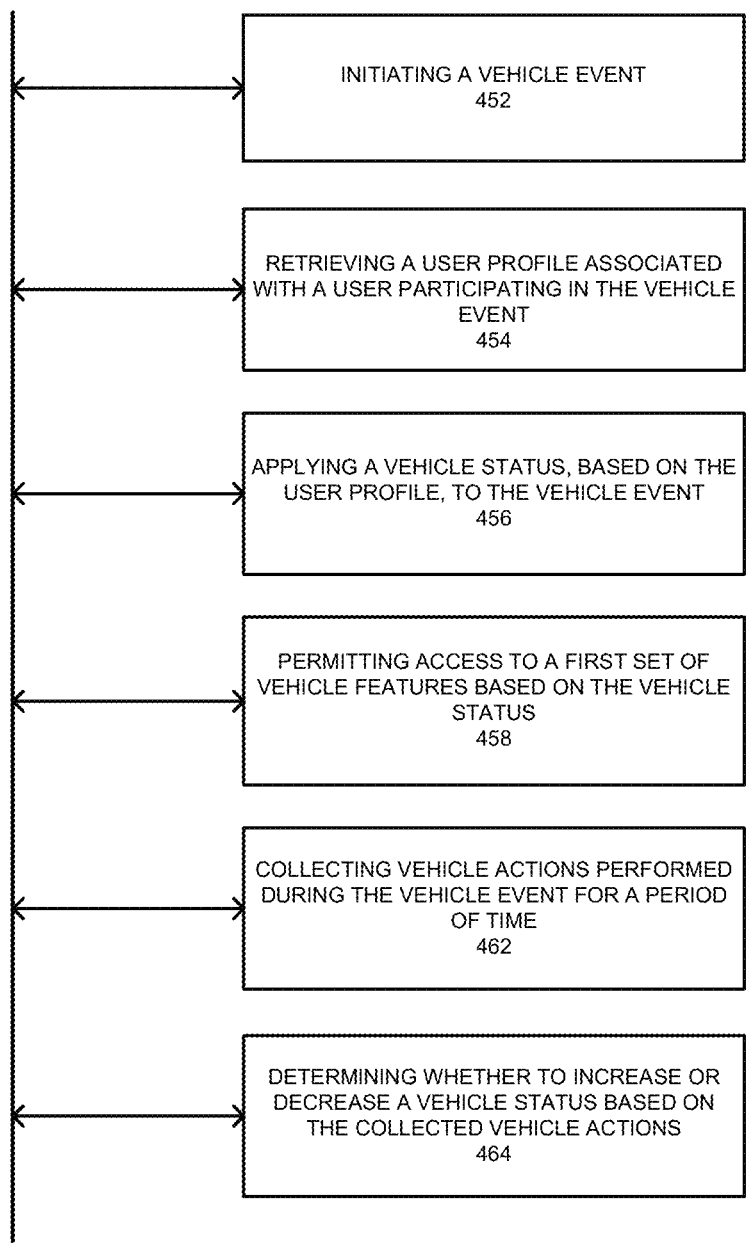
FIG. 4B illustrates a transport request and vehicle status setup configuration, according to example embodiments.

FIG. 4B illustrates a transport request and vehicle status setup configuration, according to example embodiments. Referring to FIG. 4B, the example flow diagram of operation 450 includes initiating a vehicle event 452, retrieving a user profile associated with a user participating in the vehicle event 454, and applying a vehicle status, based on the user profile, to the vehicle event 456. The user may then receive access to the event via a confirmation or other indication. The method also includes permitting access to a first set of vehicle features based on the vehicle status 458 and collecting vehicle actions performed during the vehicle event for a period of time 462. The user may only be permitted to use certain vehicle functions at the onset of the vehicle event (i.e., during the ride), however, as time progresses and the vehicle data is accumulated, certain tests may be satisfied, such as those thresholds which must be met in order to achieve an upgraded status, as a result, the vehicle features may be modified to include additional or fewer features than those which were originally permitted during the initial part of the ride. The method may also include determining whether to increase or decrease a vehicle status based on the collected vehicle actions 464.

The method may also include receiving sensor data from one or more sensors associated with the vehicle, where the sensor data is collected for the period of time, transmitting the sensor data to a server, and creating the vehicle actions based on the sensor data. The method may also include comparing the vehicle actions to a set of predetermined vehicle actions stored in the server, determining whether the vehicle actions are within a threshold range of acceptable vehicle operation, and responsive to determining the vehicle actions are within the threshold range of acceptable vehicle operation, increasing the vehicle status. In this example, the various instances of sensor data collected may be identified over a period of time, summed, averaged, and/or compared to optimal values for good driving behavior and then the result may be an increase in vehicle status, such as permitting an inexperienced driver to begin listening to the radio now that the vehicle status score has improved. The increased vehicle status permits access to a second set of vehicle features including one or more vehicle features which were not permitted during the access of the first set of vehicle features. The method may also include accessing a smart contract stored on a distributed ledger, identifying, via the smart contract, a plurality of vehicle statuses associated with corresponding sets of vehicle features, identifying the vehicle status associated with the user profile, and applying, via the smart contract, the vehicle status to the vehicle event. The method may also include identifying the increased vehicle status, and updating, via the smart contract, the increased vehicle status based on the user profile. The method may also include creating a blockchain transaction with the updated increased vehicle status based on the user profile and storing the blockchain transaction in the distributed ledger.

Another example embodiment may include a system that includes a user device, a vehicle, and a server configured to initiate a vehicle event, retrieve a user profile associated with the user device participating in the vehicle event, apply a vehicle status, based on the user profile, to the vehicle event and the vehicle, permit access to a first set of vehicle features of the vehicle based on the vehicle status, collect vehicle actions performed during the vehicle event for a period of time, and determine whether to increase or decrease a vehicle status based on the collected vehicle actions. The vehicle and the user device are configured to receive sensor data from one or more sensors associated with the vehicle, wherein the sensor data is collected for the period of time, transmit the sensor data to a server, and create the vehicle actions based on the sensor data. The server is further configured to compare the vehicle actions to a set of predetermined vehicle actions stored in the server, determine whether the vehicle actions are within a threshold range of acceptable vehicle operation, and responsive to the vehicle actions being within the threshold range of acceptable vehicle operation, increase the vehicle status. The increased vehicle status permits access to a second set of vehicle features including one or more vehicle features which were not permitted during the access to the first set of vehicle features. The server is further configured to access a smart contract stored on a distributed ledger, identify, via the smart contract, a plurality of vehicle statuses associated with corresponding sets of vehicle features, identify the vehicle status associated with the user profile, and apply, via the smart contract, the vehicle status to the vehicle event. The server is further configured to identify the increased vehicle status, and update, via the smart contract, the increased vehicle status based on the user profile. The server is further configured to create a blockchain transaction with the updated increased vehicle status based on the user profile and store the blockchain transaction in the distributed ledger. In one example, the vehicle event includes one or more of requesting access to a vehicle, initiating a ride in a vehicle and accessing a vehicle the vehicle features comprise one or more of distance permitted to be traveled in the vehicle, a maximum speed permitted to be driven in the vehicle, an acceleration rate permitted to be used in the vehicle, radio stations permitted to be played in the vehicle, navigation applications permitted to be used while driving the vehicle.

Figure 4C:
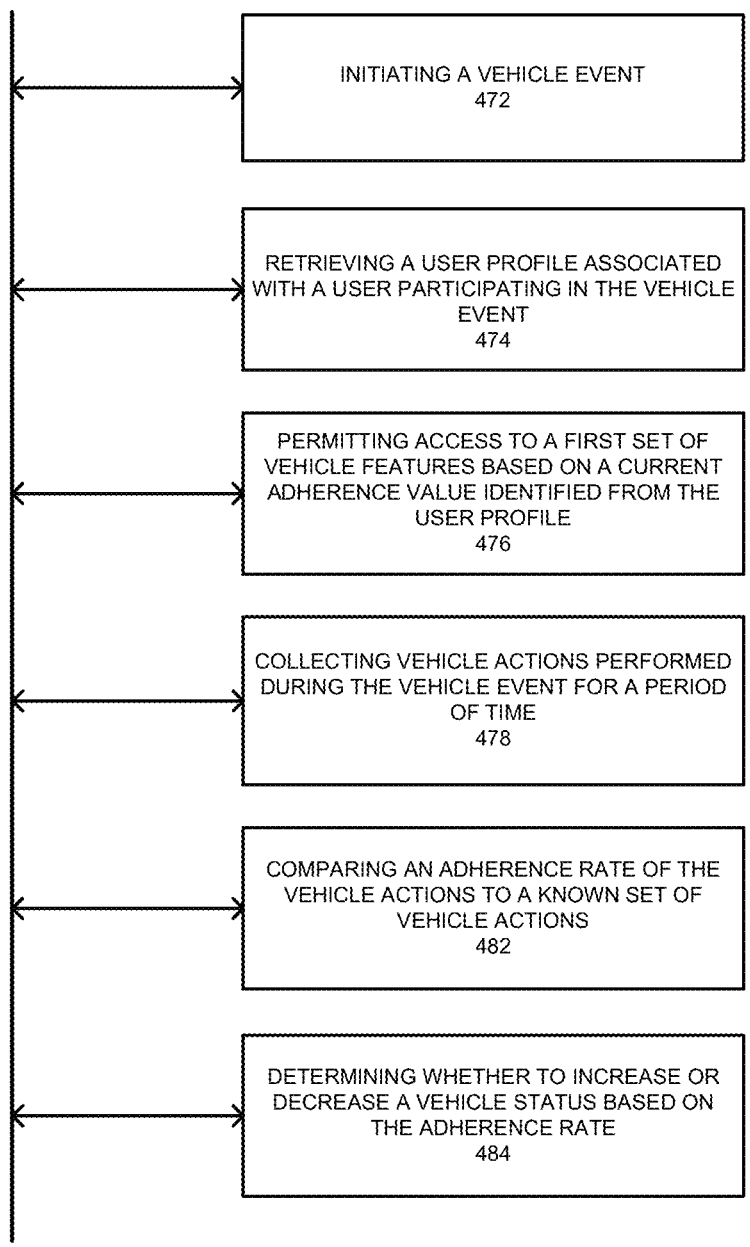
FIG. 4C illustrates a transport request and vehicle status setup and user adherence configuration, according to example embodiments.

FIG. 4C illustrates a transport request and vehicle status setup and user adherence configuration, according to example embodiments. Referring to FIG. 4C, the flow diagram 470 includes initiating a vehicle event 472, retrieving a user profile associated with a user participating in the vehicle event 474, and permitting access to a first set of vehicle features based on a current adherence value identified from the user profile 476. For example, as the user actions are identified and the actions adhere to certain policies or rules, the vehicle features may be offered as a reward to those individuals that adhered to the rules or policies. For example, safe driving involves speed, maneuvering, acceleration, non-phone use, gradual lane changes, etc. As those elements of a vehicle's operation are monitored for a particular driver, the features may be upgraded as the behavior adheres to a level of compliance. The method may also include collecting vehicle actions performed during the vehicle event for a period of time 478, which may be compared to a known set of vehicle actions to identify an adherence rate 482 and determining whether to increase or decrease a vehicle status based on the adherence rate 484. In one example, the adherence rate is based on a number of adhered to vehicle actions which match known vehicle actions. For example, an interval of five minutes may be used as a basis to determine vehicle velocity, when the vehicle does not exceed known speed limits, or exceed by more than five miles per hour, for those streets traveled for the five minutes, then the vehicle action may be deemed an adherence and points, or a reward should be credited to the user profile.

Figure 5A:
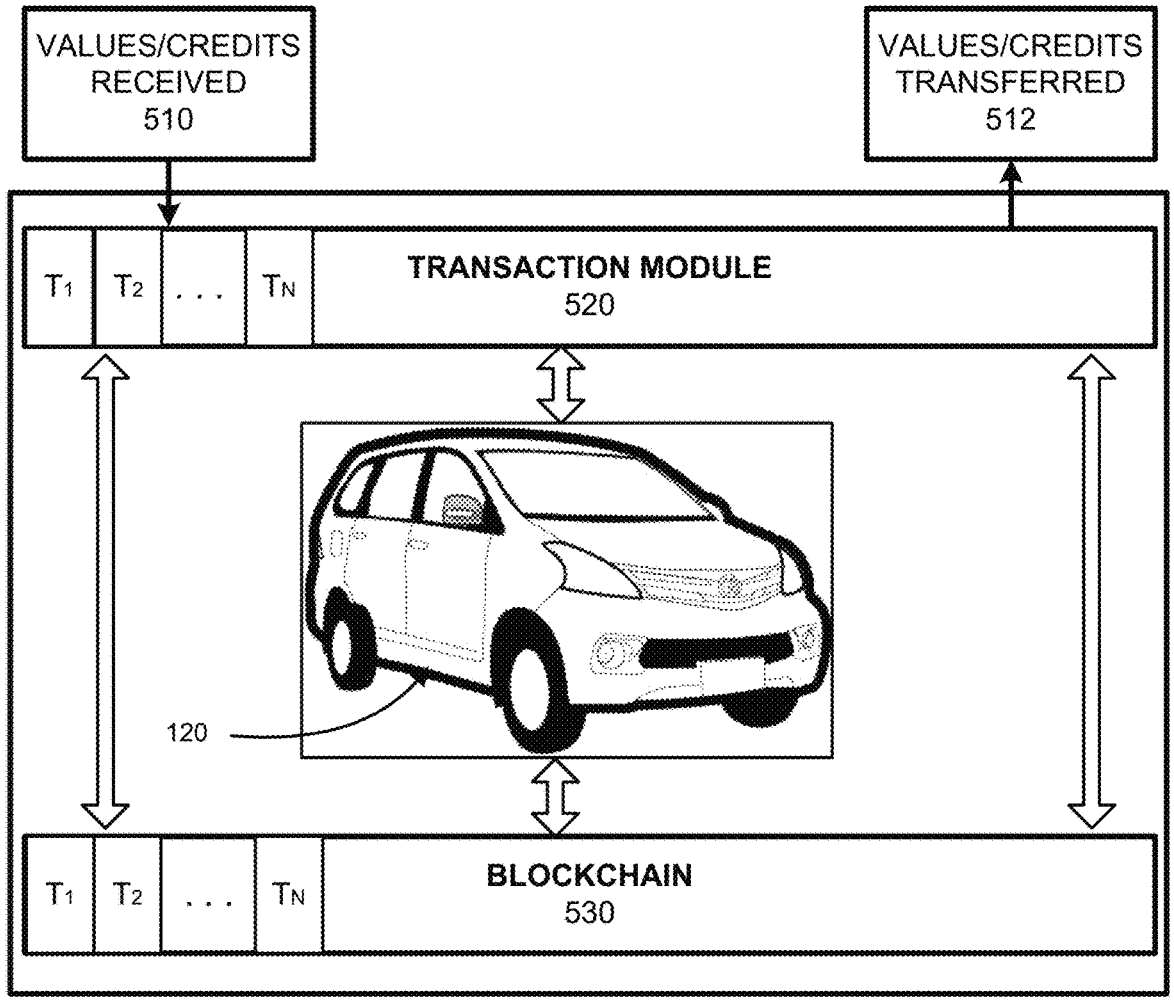
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 120 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 120. The values/credits received and/or transferred are based on one or more of a user behavior, a vehicle event, a vehicle status, and a vehicle action as described herein.

Figure 5B:
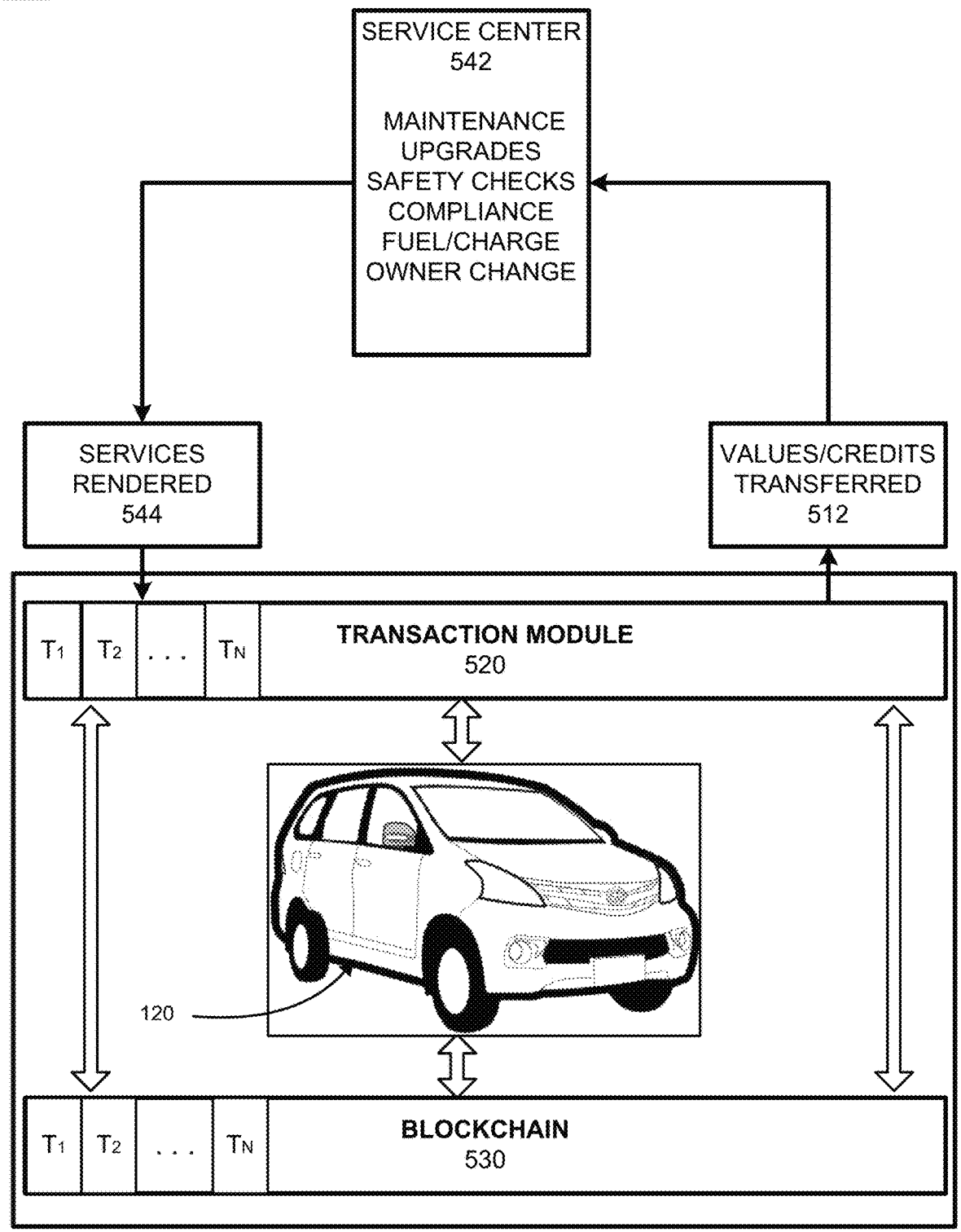
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 120 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge or replacement, tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 120 and/or the service center 542. In one example, a transport event may require a refuel or other vehicle service and the user may then be responsible for the responsibility value increase for such service. The service may be rendered via a blockchain notification which is then used to redistribute the responsibility value to the user via their respective fractional responsibility values. Adherence to a regular service schedule may be part of the adherence rate or compliance necessary to achieve an optimal user vehicle status. The service center activities can be based on one or more of a user behavior, a vehicle event, a vehicle status, and a vehicle action as described herein.

Figure 5C:
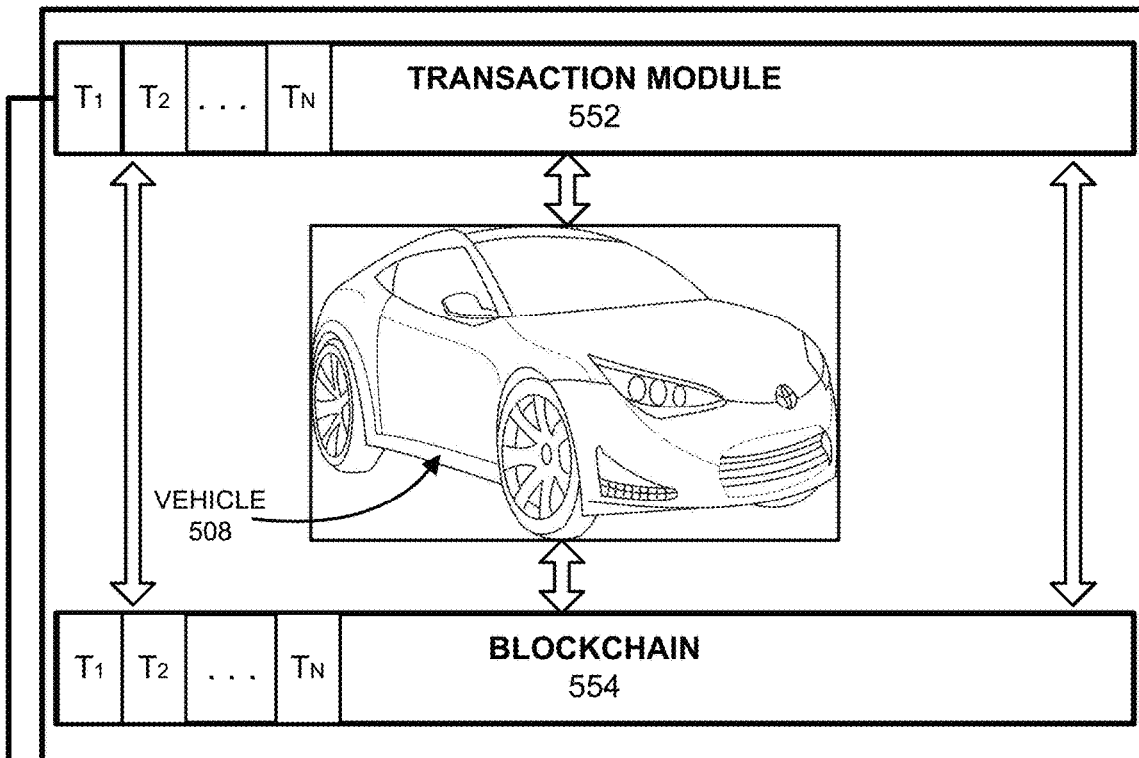
FIG. 5C illustrates a further example blockchain transport configuration, according to example embodiments.
Figure 5C:
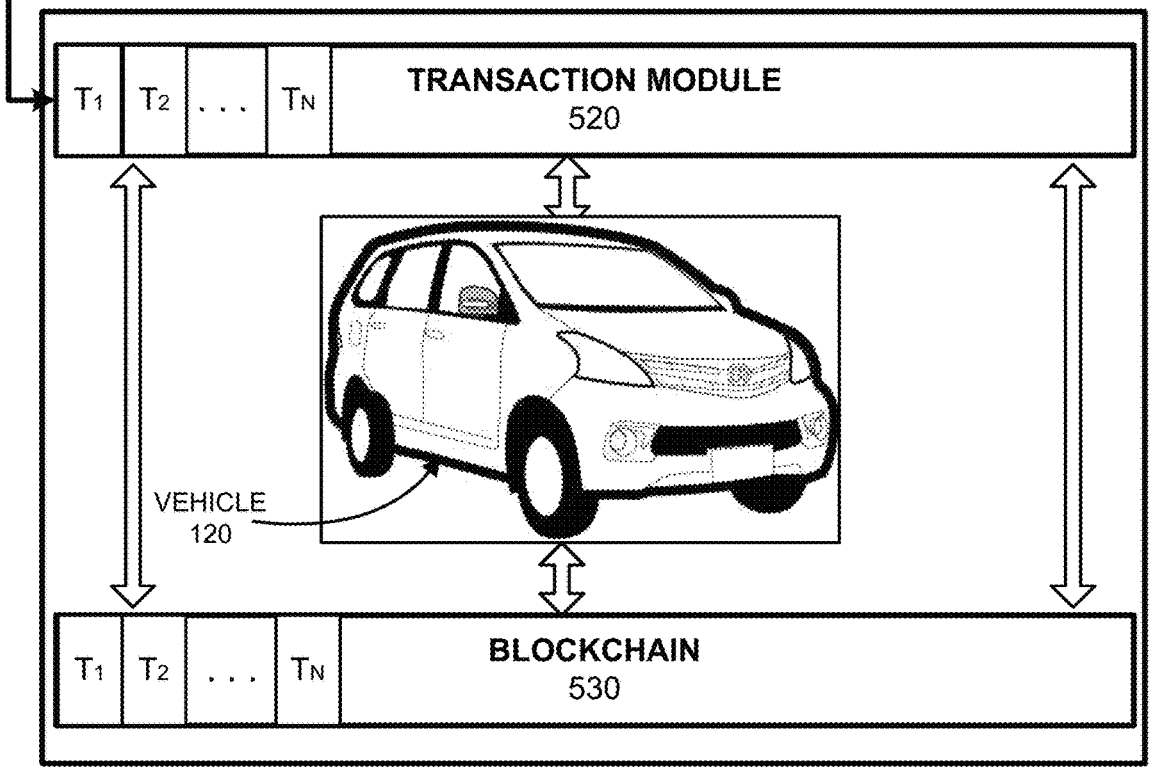

FIG. 5C illustrates an example blockchain vehicle configuration 550 for managing blockchain transactions conducted among various vehicles, according to example embodiments. The vehicle 120 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 120 which is in its network and which operates on its blockchain member service. The vehicle 120 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 120 and the record of the transferred service is logged in the blockchain 530/554 assuming that the blockchains are different from one another, or, are logged in the same blockchain used by all members. The transferred credits can be based on one or more of a user behavior, a vehicle event, a vehicle status, and a vehicle action as described herein.

Figure 6:
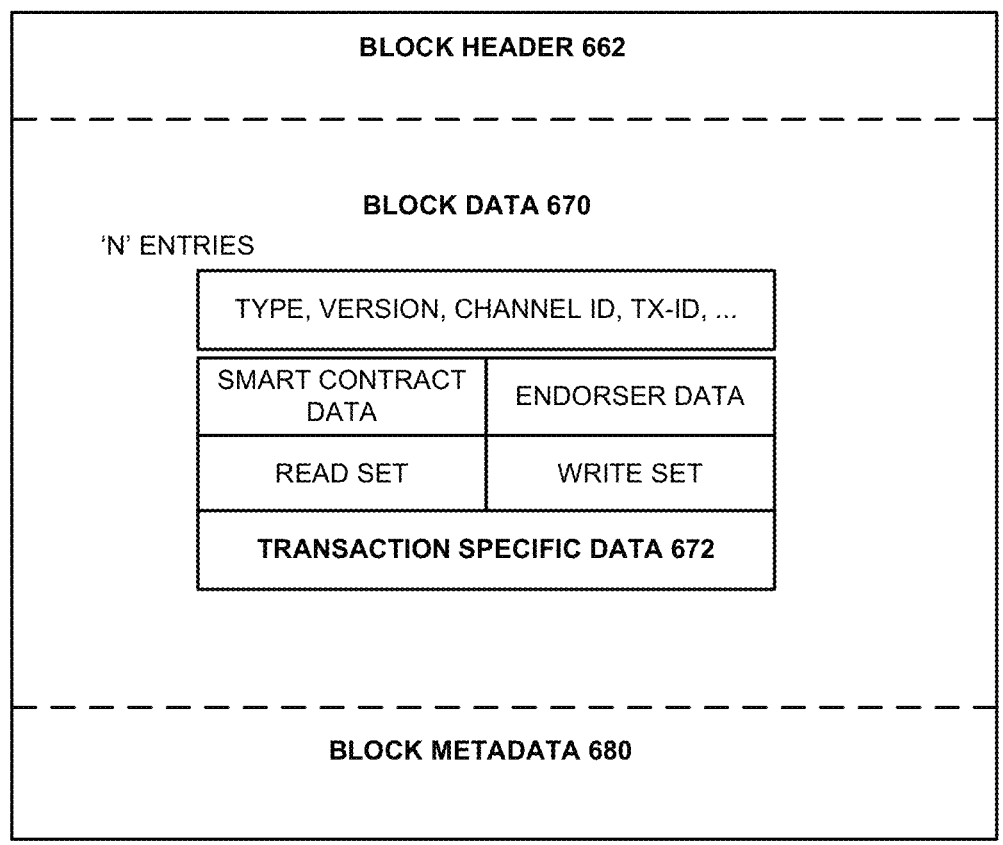
FIG. 6 illustrates an example data block, according to example embodiments.

FIG. 6 illustrates a blockchain block 600 that can be added to a distributed ledger, according to example embodiments, and contents of a block structure 660. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 660 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
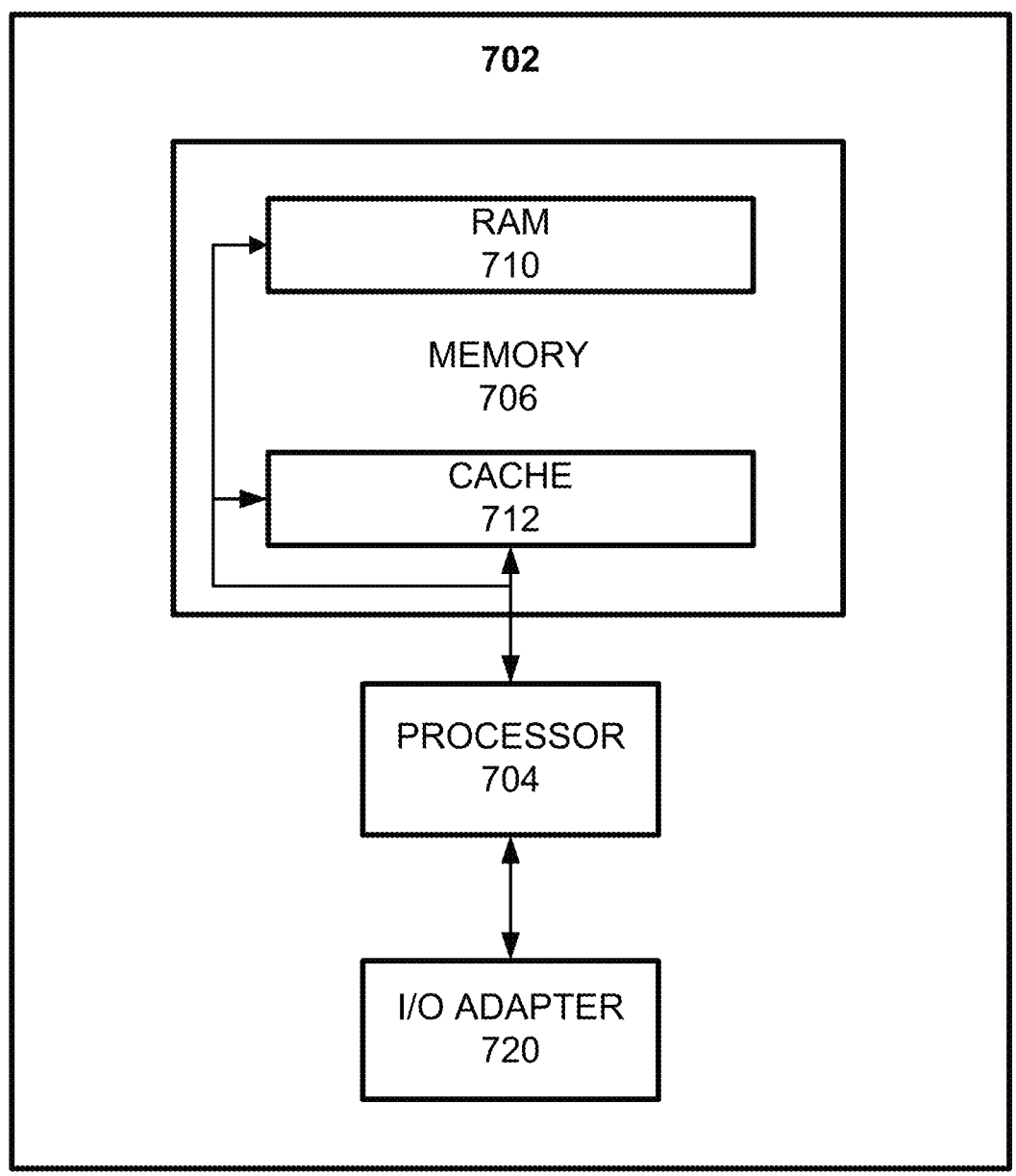
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O adapter 720, such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces of the adapter 720. Still yet, computer system/server 702 can communicate with one or more networks such as a local area network (LAN), a general wide area network (WAN), and/or a public network (e.g., the Internet) via a network adapter. As depicted, adapter 720 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   monitoring data when the data is associated with at least one detected behavior of a first user;
   quantifying the at least one detected behavior into a first value;
   sending the first value to a first server and a second server;
   comparing the first value to a first threshold at the first server;
   comparing the first value to a second threshold at the second server;
   determining whether to increment a first score at the first server and a second score at the second server, when the first value is greater than one or more of the first threshold and the second threshold; and
   determining whether to decrement the first score at the first server and the second score at the second server, when the first value is less than one or more of the first threshold and the second threshold.

2. The method of claim 1, further comprising:
   deducting, via one or more of the first server and the second server, a portion of the first score and adding the deducted portion to a third score associated with a user device of a second user when the user device associated with the first user shares the portion of the first score with the third score.

3. The method of claim 2, further comprising:
   incrementing, via one or more of the first server and the second server, the first score by the deducted portion, when a second value quantified by at least one detected behavior of the second user is above the second threshold; and
   decrementing, via one or more of the first server and the second server, the first score by the deducted portion when a second value quantified by at least one detected behavior of the second user is below the second threshold.

4. The method of claim 2, further comprising:
   incrementing, via one or more of the first server and the second server, the first score by a value greater than the deducted portion when a second value quantified by at least one detected behavior of the second user is above the second threshold; and
   decrementing, via one or more of the first server and the second server, the first score by a value greater than the deducted portion when a second value quantified by at least one detected behavior of the second user is below the second threshold.

5. The method of claim 1, further comprising:
applying a vehicle status to a vehicle associated with a user profile of the user when one or more of the first score and the second score is incremented.

6. The method of claim 2, further comprising:
applying a vehicle status to a vehicle associated with a user profile of the second user when the third score is incremented by the deducted portion of the first score.

7. The method of claim 5, further comprising:
enabling the vehicle, via the second server, to be operated after the vehicle status is applied.

8. A system, comprising:
a user device associated with a first user;
a first server; and
a second server operated by a third party associated with the user device;
wherein the user device contains a processor and memory on which are stored machine-readable instructions that when executed by the processor, cause the processor to:
monitor data when the data is associated with at least one detected behavior of the first user;
quantify the at least one detected behavior into a first value;
send the first value to the first server and the second server;
wherein the first server is configured to compare the first value to a first threshold; and
wherein the second server is configured to compare the first value to a second threshold;
wherein at least one of the first server and second server is configured to determine whether to increment a first score at the first server and a second score at the second server, when the first value is greater than one or more of the first threshold and the second threshold, and decrement the first score at the first server and the second score at the second server, when the first value is less than one or more of the first threshold and the second threshold.

9. The system of claim 8, wherein one or more of the first server and the second server is configured to deduct a portion of the first score and add the deducted portion to a third score associated with a user device associated with a second user when the user device associated with the first user shares the portion of the first score with the third score.

10. The system of claim 9, wherein one or more of the first server and the second server is configured to perform at least one of:
increment the first score by the deducted portion when a second value quantified by at least one detected behavior of the second user is above the second threshold; and
decrement the first score by the deducted portion when a second value quantified by at least one detected behavior of the second user is below the second threshold.

11. The system of claim 9, wherein one or more of the first server and the second server is configured to perform at least one of:
increment the first score by a value greater than the deducted portion when a second value quantified by at least one detected behavior of the second user is above the second threshold; and
decrement the first score by a value greater than the deducted portion when a second value quantified by at least one detected behavior of the second user is below the second threshold.

12. The system of claim 8, further comprising:
a vehicle configured to apply a vehicle status associated with a user profile of the user when one or more of the first score and the second score is incremented.

13. The system of claim 9, further comprising:
a vehicle configured to apply a vehicle status associated with a user profile of the second user when the third score is incremented by the deducted portion of the first score.

14. The system of claim 12, wherein the second server is configured to enable the vehicle to be operated after the vehicle status is applied.

15. A non-transitory computer readable medium comprising instructions, that when read by a processor, cause the processor to perform:
monitoring data when the data is associated with at least one detected behavior of a first user;
quantifying the at least one detected behavior into a first value;
sending the first value to a first server and a second server;
comparing the first value to a first threshold at the first server;
comparing the first value to a second threshold at the second server;
determining whether to increment a first score at the first server and a second score at the second server, when the first value is greater than one or more of the first threshold and the second threshold; and
determining whether to decrement the first score at the first server and the second score at the second server, when the first value is less than one or more of the first threshold and the second threshold.

16. The non-transitory computer readable medium of claim 15, further comprising:
deducting, via one or more of the first server and the second server, a portion of the first score and adding the deducted portion to a third score associated with a user device of a second user when the user device associated with the first user shares the portion of the first score with the third score.

17. The non-transitory computer readable medium of claim 16, further comprising:
incrementing, via one or more of the first server and the second server, the first score by the deducted portion, when a second value quantified by at least one detected behavior of the second user is above the second threshold; and
decrementing, via one or more of the first server and the second server, the first score by the deducted portion when a second value quantified by at least one detected behavior of the second user is below the second threshold.

18. The non-transitory computer readable medium of claim 16, further comprising:
incrementing, via one or more of the first server and the second server, the first score by a value greater than the deducted portion when a second value quantified by at least one detected behavior of the second user is above the second threshold; and
decrementing, via one or more of the first server and the second server, the first score by a value greater than the deducted portion when a second value quantified by at least one detected behavior of the second user is below the second threshold.

19. The non-transitory computer readable medium of claim 15, further comprising:
 applying a vehicle status to a vehicle associated with a user profile of the user when one or more of the first score and the second score is incremented.

20. The non-transitory computer readable medium of claim 16, further comprising:
 applying a vehicle status to a vehicle associated with a user profile of the second user when the third score is incremented by the deducted portion of the first score.

* * * * *